Sept. 8, 1953

M. D. JUSTISS ET AL 2,651,280

PLANT SETTING MACHINE

Filed Oct. 3, 1950

Inventor
MARCUS D. JUSTISS
THOMAS U. FALLIN

By

*James W Paxton*
*Agt.*

Sept. 8, 1953     M. D. JUSTISS ET AL     2,651,280
PLANT SETTING MACHINE

Filed Oct. 3, 1950     2 Sheets-Sheet 2

Inventor
MARCUS D. JUSTISS
THOMAS U. FALLIN

By

Patented Sept. 8, 1953

2,651,280

UNITED STATES PATENT OFFICE 2,651,280

PLANT SETTING MACHINE

Marcus D. Justiss, Prescott, and Thomas U. Fallin, Magnolia, Ark.

Application October 3, 1950, Serial No. 188,116

3 Claims. (Cl. 116—60)

The present invention relates to a plant setting machine, and more particularly has reference to a plant setting machine adapted to be coupled to a mobile vehicle, such as a trailer, the machine being so constructed that the plants cannot be struck by the machine after being set in the ground and thus dislodge the plant from its proper position in the soil.

Viewing the invention broadly, it comprises a frame supported at the rear of and trailing the towing vehicle, the frame being supported above the ground level by wheeled means, a receptacle for containing the plants to be set, a pair of packing wheels located rearwardly of the plant containing means, and a signalling device to indicate the time for setting the plant.

More specifically, the packing wheels are provided with individual axles so that the plant will remain upright as the wheels pass thereby, the packing wheels being angularly disposed so that the gap at the leading edge of the wheels is of greater width than at the trailing edge. In addition, the signalling device comprises an audible signal which is operatively connected through a drive assembly with one of the packing wheels, and means is associated therewith to regulate the intervals at which the audible signal operates.

An object of our invention is to provide a plant setting machine which is relatively simple in structural detail, positive and efficient in operation, and which can be inexpensively manufactured.

Yet another object of the present invention is to provide a plant setting machine adapted to be coupled to the rear of a towing vehicle which is provided with an audible signal carried by the frame of the vehicle, the signal being operated at predetermined intervals as the machine traverses the ground to indicate to the operator when a plant should be set.

A further object of our present invention is to provide a plant setting machine with a pair of spaced apart packing wheels, each wheel being carried by an individual axle so as to form a free pathway between the packing wheels and thus prevent the wheels from striking the deposited plant and thus dislodge the plant from its proper position in the soil.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 4 is a detail side elevational view, partly in section, showing the pivotal connection of the forward end of the machine.

Figure 1:
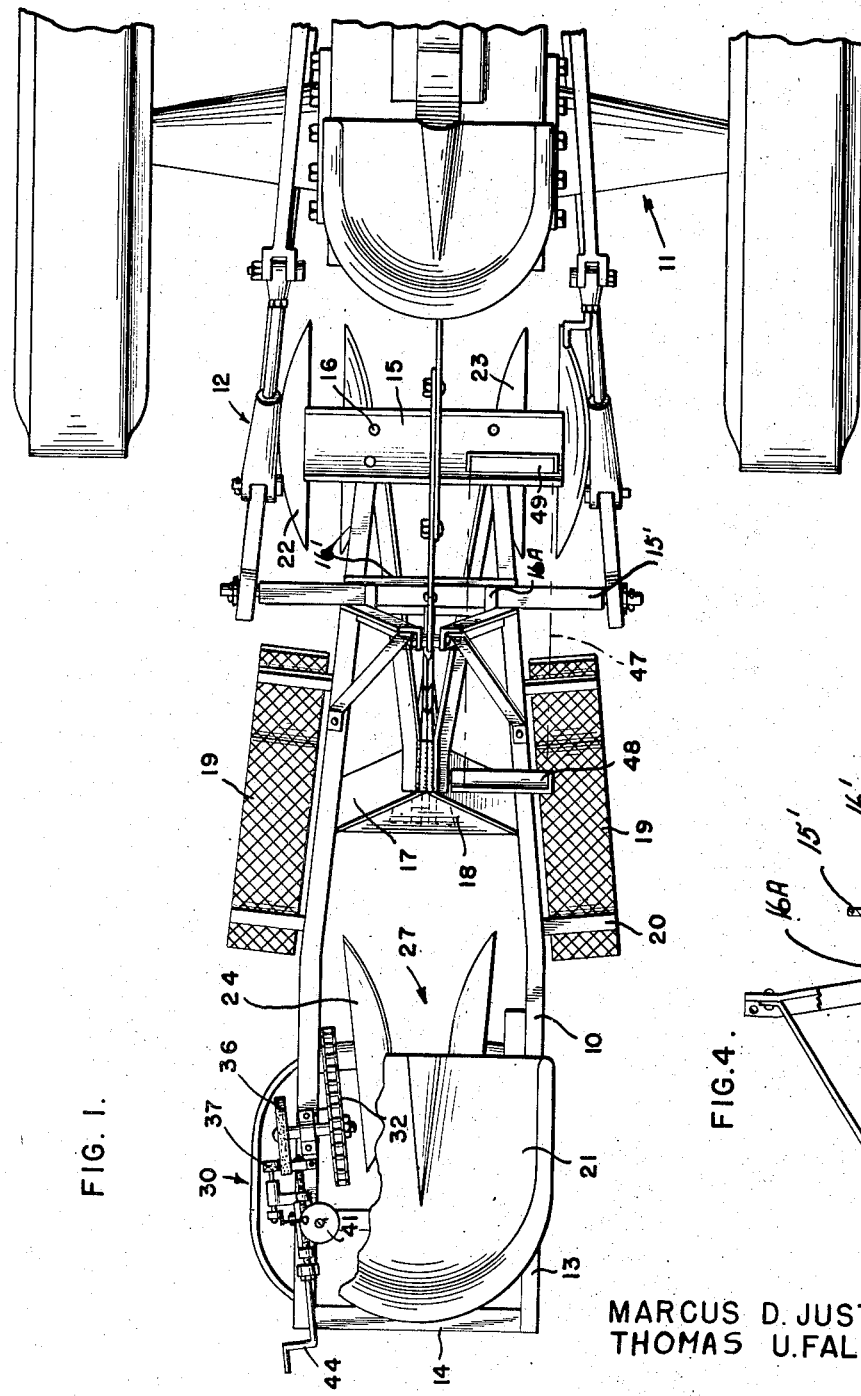
Figure 1 is a plan view, partly broken away, of a plant setting machine constructed in accordance with our inventive concept.

Referring to the drawings, and more particularly to Figure 1, we have indicated the plant setting machine generally 10, 11 illustrating a towing vehicle, such as a tractor, and 12 a connection between the setting machine and the tractor whereby the machine may be elevated by activation of the controls on the tractor. Inasmuch as this particular structure does not form a salient part of the invention, it is not deemed necessary to describe the connection in detail.

The machine 10 comprises a pair of longitudinal frame elements 13, preferably I-beams, and the rear ends of the frame elements are connected by a transverse I-beam 14. The beams 13 converge toward their front ends and are connected to a drawbar 15', to the ends of which the lifting connection, designated generally 12, is operatively attached. The drawbar 15' is pivotally connected intermediate the ends thereof to a plate 16' by a rivet or the like 15A, which plate in turn is bolted to a channel iron 15 as shown at 16. The rivet 15A extends through an aperture 15B in the plate, the aperture being an oblong or longitudinally extending opening, and the vertical flange of the drawbar 15' is adapted in one position to engage a pair of horizontal cleats 16A, as will later be more fully described. Intermediate the ends of the frame members 13, it will be noted that a pair of upwardly extending straps 17 converge at their free ends, and the lower ends thereof are secured to the frame elements by welding or the like. A cross or transversely extending member 18 is secured at its outer ends to the frame members 13 for strengthening or reinforcing purposes.

A pair of foot supports or plates 19 are attached to the outer face of each of the frame members 13 by supporting elements 20, and a spring mounted seat 21 is carried by the frame members 13 in proximity to the rear end of the machine.

Pairs of spaced disks 22 and 23 are supported by the transverse channel bar 15, and a pair of spaced packing wheels 24 are mounted on the frame members 13 intermediate the I-beam 14 and the straps 17. It can be seen that each wheel 24 is provided with an individual axle 25 supported by a bearing block assembly 26 mounted on the lower flange of the frame element 13. Hence, the individual mounting of the wheels 24 provides a free pathway or opening 27 between the wheels and the leading or front end of the passage is of greater width than the rear end of the passage. In other words, the wheels 24 are angularly supported by the frame elements 13 and we have found that if the front of the wheels is spaced 8⅓ inches and the rear 6¾ inches, the most advantageous results are achieved. As will later be more fully described, after the plant has been dropped forwardly of the wheels 24, the passage of the wheels past the plant will not strike the plant and move it from its proper position.

Figure 2:
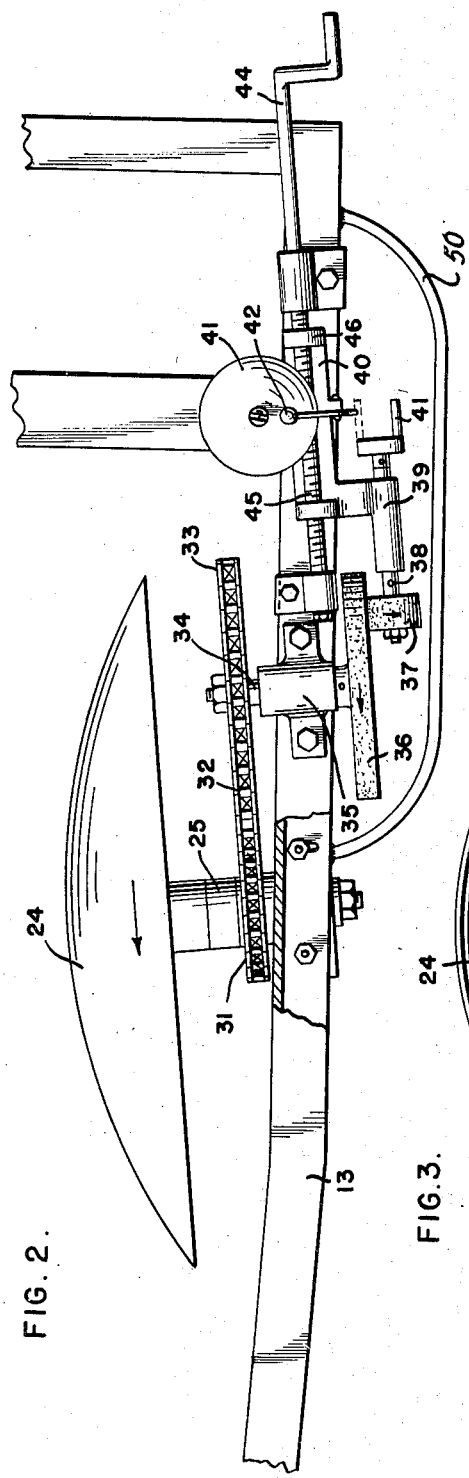
Figure 2 is a fragmental plan view, partly in section, illustrating the signalling device.
Figure 3:
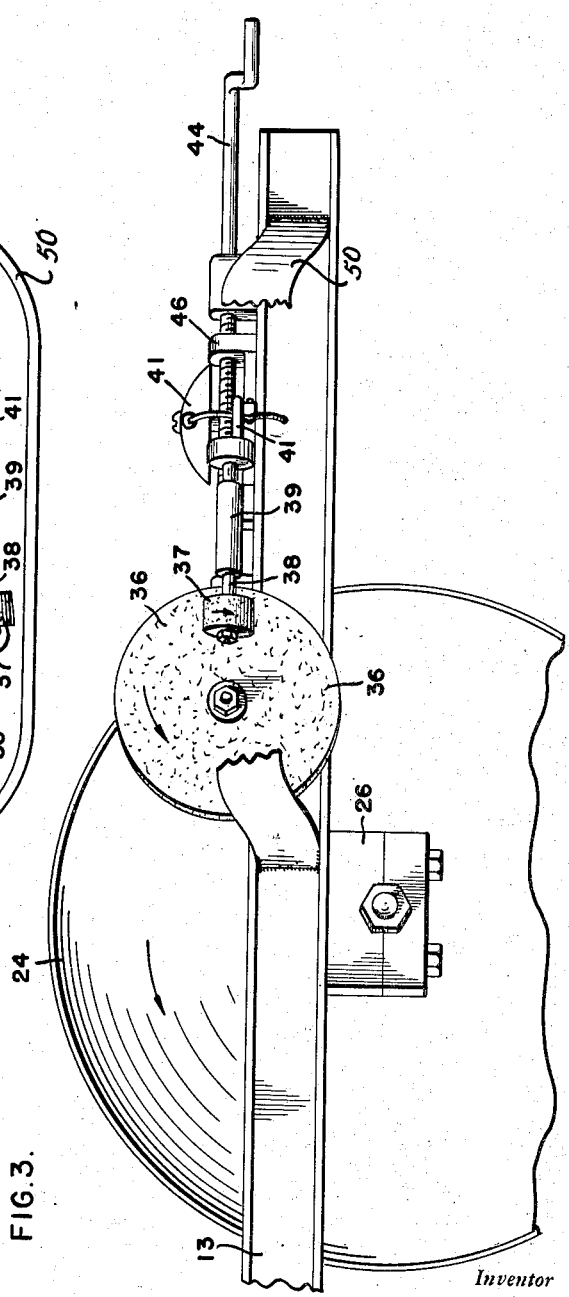
Figure 3 is a view in side elevation of the assembly shown in Figure 2.

As hereinabove indicated, we have provided an audible signal to indicate to the operator when to drop the individual plants and this indicator is denoted generally 30. As shown in Figure 2, a sprocket 31 is attached to the axle of one of the packing wheels 24 (preferably the left wheel), and a chain 32 is trained over the sprocket 31, and a second sprocket 33 of larger diameter carried by a shaft 34 which is journalled in a bearing block 35 removably secured to the upper flange of the frame element 13. A rubber covered pulley 36 is secured to the free or outer end of the shaft 34 and drives a smaller pulley or roller 37 mounted on a shaft 38 which, in turn, is journalled in a sleeve 39 carried by a bracket 40 pivoted to the upper flange of the frame element 13. A bell casing 41 having a pivoted clapper 42 is conveniently secured to the frame element 13, and the outer end of the shaft 38 supports an eccentrically mounted finger 41' which, during rotation, is adapted to strike the clapper finger to ring the bell. Spring means 43 cooperates with the bracket 40 to maintain the pulley or roller 37 in engagement with the outer flat face of the pulley 36.

Hence, it can be seen that as the machine 10 traverses the ground, rotation of the wheel 24 will turn the sprocket 31 and, as a consequence, the pulley 36. The pulley 36 will frictionally drive the smaller pulley 37 so that the eccentrically mounted finger 41' will strike the bell clapper finger to ring the bell at the desired intervals.

In order to change the number of revolutions of rotation imparted to the pulley 37 to vary the time intervals, it will be noted that a crank element 44 is provided with a threaded portion 45 which cooperates with threaded openings formed in ears 46 on the bracket 40. Rotation of the crank 44 will move the sleeve 39 and, of course, the pulley 37 either toward the center or the outer periphery of the pulley 36 to thus vary the speed at which the finger 41' turns. It can be seen that the outer end of the crank 44 extends to a point beyond the rear of the machine 10 and the necessary adjustment can be easily and quickly effected by the operator.

In order to support a plant receptacle shown by the broken lines indicated 47, it will be seen that an L-shaped bracket 48 is secured to and extends outwardly from one of the upwardly extending straps 17 and that a similar supporting member 49 is carried by the channel member 15. Consequently, the plant container will be supported at a height which is readily accessible to the operator sitting in the seat 21 and he may readily remove the plant from the container 47 and drop the same between the strap 17 and the packing wheels 24 when the bell 41 indicates that a plant should be deposited. The wheels 24 will clear the plant by virtue of the individual mounting of the wheels and there is no danger of the plant being disturbed from its set position.

To protect the working parts of the signalling device 30 from damage, it will be noted that a guard 50 extends outwardly from frame member 13 and projects beyond the elements supported by the frame member. The ends of the guard may be welded or otherwise secured to the web of the I-beam.

By virtue of the pivotal connection of the drawbar 15', it is possible for the machine to trail properly when planting curved rows so that the packing wheels may pass an equal distance from the plants. When the machine is raised above the ground by virtue of the connection 12, the drawbar 15' will move rearwardly and contact the cleat 16A which will cause the planter to aline itself straight behind the towing vehicle.

The invention is not to be confined to any strict conformity with the showing in the drawings, but may be changed or modified so long as such changes mark no material departure from the salient features of the invention, as expressed in the appended claims.

We claim:

1. In a signalling assembly adapted to be operated at predetermined intervals for use with plant setting machines, a frame, wheels therefor and an alarm mounted on the frame, a pulley journalled on the frame, a drive connection between the pulley and one of the wheels so that movement of the frame will rotate the pulley, a second pulley of lesser diameter than the first named pulley journalled on the frame, the periphery of the second named pulley engaging a planar face on the first named pulley, means to adjust the second named pulley radially of the planar face of the first named pulley to regulate the rate of rotation of the second named pulley, an alarm actuator, and means carried by the second named pulley and rotating therewith to move the actuator at predetermined intervals to operate the alarm.

2. An assembly as defined in and claimed by claim 1 further characterized in that said drive connection between the first named pulley and the wheel includes sprockets on the wheel and the first named pulley, and a chain trained over said sprockets, the sprocket on the pulley being of greater diameter than the sprocket on the wheel.

3. In a signalling assembly operated at predetermined intervals for use with a plant setting machine, a frame, wheels therefor, a bell on the frame, a pivoted clapper therefor, a shaft rotatable on the frame, a friction wheel carried by said shaft, a drive connection between the shaft and one of the frame wheels, a bracket adjustably carried by the frame in spaced relation to said friction wheel shaft, means on said bracket defining a bearing disposed at right angles to said friction wheel shaft, a second shaft journalled in the bearing, a second friction wheel of lesser diameter than the first named friction wheel carried by the second named shaft and engaging a planar face on the first named friction wheel, means to adjust said bracket toward and away from the first named shaft to adjust the position of the second named friction wheel radially of the planar face of the first named friction wheel to regulate the rate of rotation of the second named friction wheel and an eccentrically mounted finger carried by said second named shaft adapted to periodically strike the pivoted clapper to move the clapper into contact with the bell during movement of the frame along the ground.

MARCUS D. JUSTISS.
THOMAS U. FALLIN.

References Cited in the file of this patent

UNITED STATES PATENTS

| Number | Name | Date |
|---|---|---|
| 722,587 | Justen | Mar. 10, 1903 |
| 977,254 | Affleck | Nov. 29, 1910 |
| 1,073,702 | Owens | Sept. 23, 1913 |
| 1,223,965 | Gumaer | Apr. 24, 1917 |
| 1,232,549 | Hoover | July 10, 1917 |
| 1,267,713 | Thompson | May 28, 1918 |
| 1,972,281 | Walling | Sept. 4, 1934 |
| 2,125,504 | Karst | Aug. 2, 1938 |

FOREIGN PATENTS

| Number | Country | Date |
|---|---|---|
| 557,603 | Great Britain | Nov. 26, 1943 |
| 895,779 | France | Apr. 11, 1944 |